United States Patent
Hottebart et al.

(10) Patent No.: US 6,672,149 B2
(45) Date of Patent: Jan. 6, 2004

(54) METHOD FOR ASSESSING THE RANGE OF A RUN-FLAT SYSTEM

(75) Inventors: Francois Hottebart, Ashikaga (JP); Russell Shepherd, Clermont-Ferrand (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 10/350,259

(22) Filed: Jan. 23, 2003

(65) Prior Publication Data

US 2003/0140687 A1 Jul. 31, 2003

Related U.S. Application Data

(63) Continuation of application No. PCT/EP01/08429, filed on Jul. 20, 2001.

(30) Foreign Application Priority Data

Jul. 25, 2000 (FR) .............................................. 00 09734

(51) Int. Cl.$^7$ .......................... G01M 17/02; B60G 11/24
(52) U.S. Cl. ........................ 73/146; 152/158; 152/154.2
(58) Field of Search ................................ 73/146, 146.2, 73/146.3, 146.4, 146.5, 146.8; 152/158, 454, 517, 209, 154.2

(56) References Cited

U.S. PATENT DOCUMENTS

| | | | | |
|---|---|---|---|---|
| 3,872,907 A | * | 3/1975 | Curtiss et al. .............. | 152/158 |
| 4,148,348 A | * | 4/1979 | French et al. ............. | 152/379.3 |
| 4,153,095 A | * | 5/1979 | Sarkissian .................... | 152/504 |
| 4,274,466 A | * | 6/1981 | French et al. ............. | 152/381.3 |
| 4,351,382 A | * | 9/1982 | Corner et al. ............... | 152/516 |
| 4,578,735 A | * | 3/1986 | Knecht et al. ........... | 361/283.4 |
| 4,580,610 A | * | 4/1986 | Jackson ....................... | 152/516 |
| 5,634,993 A | * | 6/1997 | Drieux et al. ............... | 152/158 |
| 5,868,190 A | * | 2/1999 | Willard et al. .............. | 152/517 |
| 5,879,482 A | * | 3/1999 | Rooney et al. ........ | 152/209.16 |
| 5,891,279 A | * | 4/1999 | Lacour ....................... | 152/520 |
| 5,968,294 A | * | 10/1999 | Willard et al. .............. | 152/517 |
| 6,026,878 A | * | 2/2000 | Zhang et al. ............... | 152/454 |
| 6,092,575 A | * | 7/2000 | Drieux et al. ............... | 152/158 |
| 6,142,204 A | * | 11/2000 | Omoteda et al. ........... | 152/517 |

* cited by examiner

*Primary Examiner*—Edward Lefkowitz
*Assistant Examiner*—Andre Allen
(74) *Attorney, Agent, or Firm*—Martin Farrell; Alan A. Csontos

(57) ABSTRACT

The invention concerns a method for assessing the range of a motor vehicle run-flat system comprising at least for each wheel a tire casing, a deflation alarm and means supporting the running tread of the tire casing when the casing is deflated, which method, from the instant the deflation alarm has detected a predetermined deflating threshold, includes the steps of: periodically measuring the distance covered and a parameter C(t) characteristic of the running conditions; determining on the basis of C(t) and the measured distance over Δt a quantity characteristic of potential elementary damage of the system during the elapsed time Δt; calculating an estimate of the global damage by combining the calculated elementary damage levels since the start of flat running; and transmitting to the vehicle driver a quantity related to that estimate of the flat running system global damage.

26 Claims, 1 Drawing Sheet

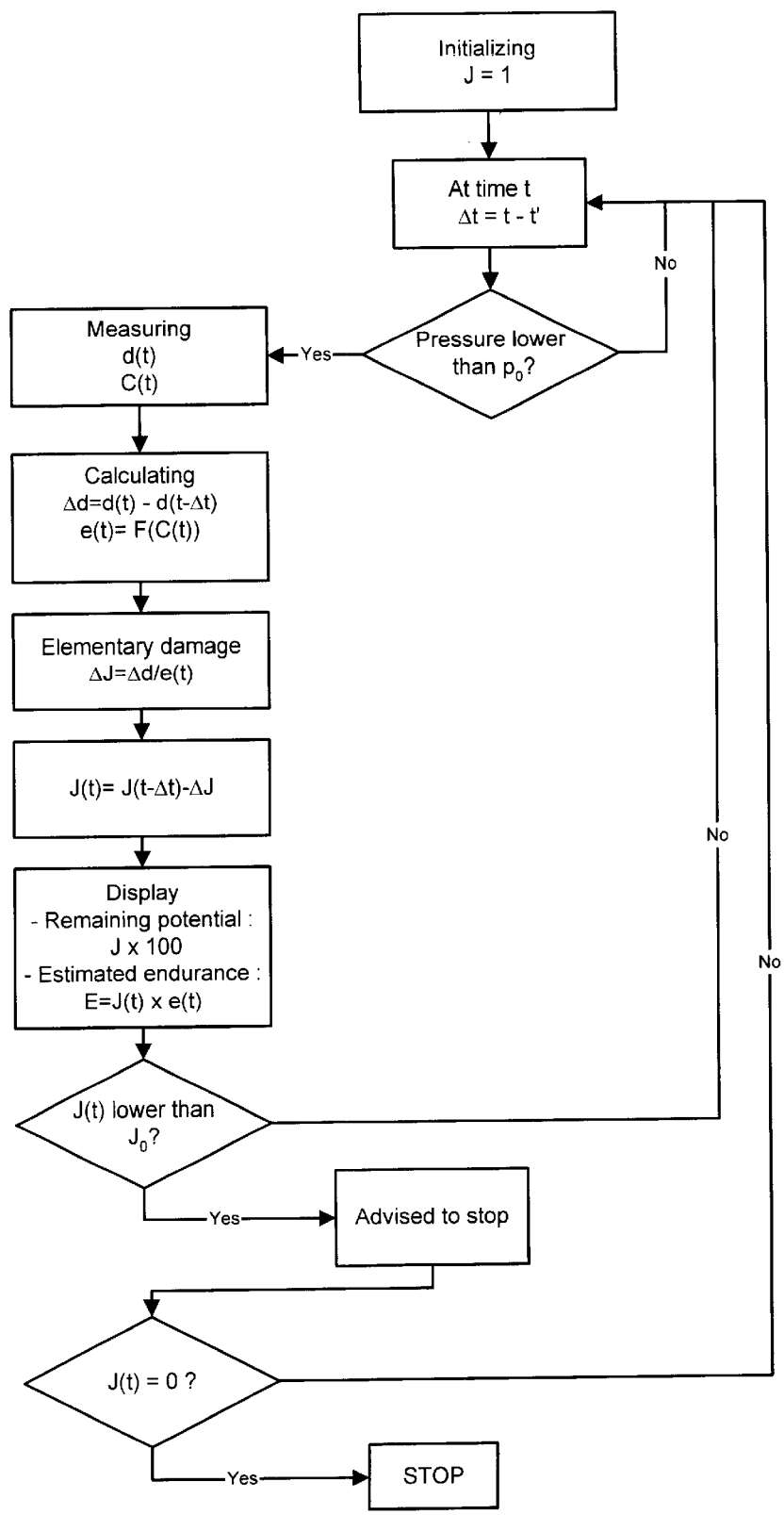
Figure

METHOD FOR ASSESSING THE RANGE OF A RUN-FLAT SYSTEM

This is a continuation of application No. PCT/EP01/08429 filed Jul. 20, 2001.

BACKGROUND AND SUMMARY

The invention relates to a method for assessing the range of a run-flat system; here, a run-flat system designates a unit comprising, at least for each wheel, a tire, a deflation alarm, and means for supporting the tread of the tire in the event that the tire is deflated.

The method according to the invention also allows the conditions for re-using the run-flat system to be evaluated; these conditions—after travelling on a flat tire or on a tire at very low pressure—may be simply the re-use of the system as it is after repairing and reinflating the tire, or changing of the tire, or replacement of the safety bearing, or both.

It is known that the loss of pressure in a tire may be abrupt, for example following a burst, or very slow, for example after a puncture, but in all cases there is a risk of loss of control of steering of the vehicle. Devices for so-called "run-flat" operation have thus been proposed, which generally comprise an annular insert bearing mounted inside the tire to limit the deflection of the latter and where appropriate to prevent the phenomenon of bead unseating, that is to say, the displacement of a bead towards the inside of the rim, which causes the tire to be unseated from the rim.

A device of this kind is described, for example, in U.S. Pat Nos. 5,634,993 and 6,092,575 to Drieux et al., and U.S. Pat. No. 5,891,279 to Lacour, which are owned in common with the present application.

There have also been proposed tires whereof the structure, in particular of the sidewalls, is highly reinforced in order to allow them to travel at low pressure or no pressure. One example of tires of this kind, called "self-supporting", is given in U.S. Pat. No. 6,026,878 to Zhang et al.

Paradoxically, these modern devices for run-flat operation are so effective that the driver does not easily realize that the pressure in one of the tires of the vehicle has gone down. These systems must therefore include apparatus for measuring the pressure of the tires, the main function of which is to alert the driver as soon as the pressure in a tire falls below a predetermined threshold.

These run-flat systems, which are based on the use of means for supporting the tread of the tire in the event that the tire deflates arranged within or outside the tire, according to tire manufacturers, currently allow travel under run-flat conditions at limited speed (in the order of 80 km/h at most) and for a distance which is also limited (in the order of 200 km).

In reality, these limit values are determined in very harsh conditions of use for the vehicles and the run-flat systems, and they very often underestimate the potential for use in actual conditions for these systems and the range they can offer to users.

The object of the invention is in particular to continuously indicate to the driver an estimate of the actual range available in a tire after a pronounced loss of pressure, in accordance with the actual conditions of travel.

The present invention therefore enables a continuous indication to the driver of the actual available range; where appropriate, it warns the driver that the tire has gone beyond a maximum distance and that the driver should stop; finally, it specifies the conditions for re-use of the driver's run-flat system.

To obtain this result, the invention makes use of the processing of data coming from different sensors and representing significant parameters of the relevant run-flat system and the vehicle.

The method according to the invention for assessing the range of a run-flat system which is fitted to a vehicle, the system comprising, at least for each wheel, a tire, a deflation alarm and means for supporting the tread of the tire in the event that the tire is deflated, is characterized in that, from the moment when the deflation alarm has detected a predetermined threshold of deflation:

- the distance traveled and a parameter C(t) characteristic of the travel conditions are measured periodically;
- as a function of C(t) and the distance traveled over the period $\Delta t$, a quantity characteristic of a potential elementary damage to the system over the said elapsed period $\Delta t$ is determined;
- an estimate of the overall damage is calculated from a combination of the elementary damages calculated since the start of run-flat travelling; and
- there is transmitted to the driver of the vehicle a quantity linked to this estimate of overall damage to the run-flat system.

BRIEF DESCRIPTION OF THE DRAWING

The sole FIGURE is a flow diagram of a method in accordance with the invention.

DETAILED DESCRIPTION

Advantageously, from a series of travel tests in conditions corresponding to those of a characteristic parameter C, that is, characteristic of the travel conditions of the tire, there is determined a function F(C) giving, for any value of the parameter C, an estimate e of the use range of the new run-flat system in travel conditions C:

$$e(t)=F[C(t)]$$

It is possible to estimate the potential elementary damage $\Delta J$ over the period of travel $\Delta t$ by applying the ratio:

$$\Delta J = \Delta d / e(t)$$

where $\Delta d = [d(t) - d(t - \Delta t)]$ is equal to the distance traveled by the vehicle over the period $\Delta t$.

In a preferred embodiment, taking J, the potential for using the run-flat system, in any period of measurement $\Delta t$, the estimate of J(t) is updated from:

$$J(t) = J(t - \Delta t) - \Delta J$$

Preferably, J is set to 1 when the run-flat system is new.

Advantageously, the updated value of J(t) is transmitted to the driver of the vehicle. It is also possible, taking E, the remaining range of the run-flat system under current conditions of travel, to estimate E from:

$$E = J(t) \times e(t)$$

and an updated value for this estimate is transmitted regularly to the driver of the vehicle.

Clearly, it is possible to define another formula for the calculation of E without departing from the scope of the invention. In particular, in order not to be unduly affected by the large reductions in e(t) during the first kilometers of travel, the foreseeable reduction in the parameter e(t) should be anticipated.

When the potential for use falls below a given threshold $J_0$, preferably a warning is transmitted to the driver of the vehicle, recommending stopping soon.

Advantageously, when the measured inflation pressure is below a given threshold, the tire concerned is considered to be in the run-flat condition.

To prevent an overestimate of the remaining range, and in order not to encourage the driver travel on a flat tire for too long, the value of the actual range is compared with a maximum empirical value and the smaller of these two values is taken to calculate the remaining range.

In a preferred embodiment of the invention, there is used as the characteristic parameter the temperature of the air inside the tire concerned, namely:

$$C(t)=T(t)$$

In a simplified variant of the invention, $e(t)=F[C(t)]$ is given by:

$$e(t) = e_0 \exp\left[(\ln 2)\left(\frac{T_0 - T(t)}{\Delta T}\right)\right]$$

where:
- e is the modeled range expressed in kilometers (km), which corresponds to the available range before breakdown of a run-flat system travelling at a constant temperature T;
- T is the temperature of the inside air (in degrees Celsius);
- $T_0$ is an arbitrary reference temperature (in degrees Celsius), for example the maximum temperature likely to be reached;
- $e_0$ is the estimated range at temperature $T_0$; $e_0$ is in the order of 200 km;
- $\Delta T$ (in degrees Celsius) is a difference in temperature corresponding to a reduction in the range by a factor of 2; $\Delta T$ is in the order of 10° C.

Another simplified expression of the relationship between the period of range and the temperature of the inside air which may be used is:

$$e(t)=e'_0(T_0-T)+e'_1$$

where:
- e is the modeled range expressed in km, which corresponds to the available range before breakdown of a travelling run-flat system travelling at a constant temperature T;
- T is the measured temperature of the inside air (in degrees Celsius);
- $T_0$ is an arbitrary reference temperature (in degrees Celsius), for example the maximum temperature likely to be reached;
- $e'_0$ is the gradient of the linear relationship between the period of range and $(T_0-T)$, the difference between the maximum temperature and the measured temperature of the inside air;
- $e'_1$ is the estimated range at temperature $T_0$.

Clearly, it is possible to use one or another characteristic parameter of the run-flat conditions, alone or in combination, without departing from the scope of the invention.

Advantageously, these characteristic parameters may be selected from the following group: the inflation pressure, the location of the tire concerned, the load applied, the outside temperature, the speed of the vehicle, the type of vehicle, the speed of motion of the windscreen wipers, and the longitudinal and transverse forces applied to the wheel concerned.

It is also possible to make use of the location, the temperature of the inside air, and the pressure of the other, inflated tires.

The method according to the invention may also be applied, as well as to evaluate the damage and the range of the run-flat system, to evaluate the re-use of the tire implicated by travel in the flat condition and to evaluate the re-use of the safety insert, if there is one.

A flow diagram of the principle of the method, shown in FIG. 1, will now be described in order to better explain the invention.

Taking J, the potential for using the relevant run-flat system, J is set to 1 when the system is new.

Throughout travel, control measurements are taken over a period $\Delta t$. If t' is the time at which the previous measurements were taken, then $\Delta t=t-t'$. $\Delta t$ may be constant or otherwise, depending on the circumstances.

It is determined whether, at this time t, the pressure of inflation of one of the tires of the vehicle is below a threshold $p_0$ in the order of 0.7 bar. If this is not the case, the process begins again in the next period.

If one of the tires has a pressure below this value, the distance traveled d(t) since this alarm threshold was passed is measured, as is a characteristic quantity of travel on a flat tire, for example the temperature of the air inside the tire, C(t).

Then the distance traveled since the last measurement is calculated:

$$\Delta d=[d(t)-d(t-\Delta t)] \text{ and } e(t)=F[C(t)]$$

e(t) is the estimate of the range of the new run-flat system under conditions C(t). The function F(C) is determined empirically from a series of tests carried out by varying the conditions of run-flat operation. This function is usually limited to a given maximum value, for example 1500 km.

The potential elementary damage is then calculated for the measurement period concerned:

$$\Delta J=\Delta d/e(t)$$

and the current potential use of the system is updated from:

$$J(t)=J(t-\Delta t)-\Delta J$$

It is then possible to transmit to the driver of the vehicle the updated estimate of the potential of the system for use as a percentage J×100, for example. It is also possible to transmit an estimate E of the remaining range under current conditions of travel, given for example by calculating the product:

$$E=J(t)\times e(t)$$

The value of J(t) is then checked by comparison with a first threshold in the order of 10%. If this threshold has been passed, an indication is given to the driver of the vehicle that they must stop soon. When J(t) becomes 0, the driver is told that they must stop.

If this latter threshold has not been passed, the cycle of the method according to the invention is resumed at the next period $\Delta t$.

For the main characteristic parameters, it will now be explained which conditions are the most harsh and what the estimated increase in the range may be.

First of all, the residual pressure in the relevant tire: a "flat" tire does not necessarily have zero pressure, as is the case during the tests under harsh conditions; if the loss of pressure is slow (around 80% for punctures), at the beginning of travelling on the flat tire the tire heats up and even temporarily reinflates slightly: it can be estimated that an additional pressure of 0.2 bar can multiply the minimum range by 10.

As regards the load of the vehicle, the harsh tests are carried out at maximum load, which is not always the case in actuality: for example, a reduction of around 60 daN in a family car multiplies the minimum range by 2.

The outside temperature applied for the harsh tests may be 40° C. A reduction by around 12° C. multiplies the minimum range by 2.

Atmospheric conditions also have an influence: in wet weather, the range is very much increased, thanks to the lowering of the operating temperature of the system.

The condition of the ground also plays a major role: thus, on bumpy ground, which creates dynamic overload, the range is greatly reduced.

Dividing the journey into several stages increases the range a great deal, since the run-flat system cools down during the stops.

Longitudinal forces have a highly disadvantageous effect on run-flat systems, because, especially under braking, they generate dynamic overload. Run-flat systems located on the front axle are particularly sensitive to this.

Transverse forces have a highly disadvantageous effect on run-flat systems, because the forces on bends generate localized dynamic overload.

The location of the relevant tire on the vehicle, on the front or rear axle, is important, because the actual conditions of travel are a function of regulation of the suspension (for example the angle of the camber, etc.) which may differ between front and rear.

There will now be given two examples put into practice under specific conditions.

A first series of tests was performed on a Renault Scenic equipped with a PAX run-flat system from Michelin, including a rubber insert bearing. The size of the tires was 185-620 R 420. The pressure was zero (valve removed). The range quoted by the manufacturer was in the order of 200 km.

In the test, the maximum range was fixed at 1500 km and the only parameter used was the temperature (T) of the air inside the tire. For technical reasons, the maximum inside temperature which could be measured was 110° C.

When the temperature was less than 110° C., we used the following empirical formula:

$$e(t) = e_0 \exp\left[(\ln 2)\left(\frac{T_0 - T(t)}{\Delta T}\right)\right]$$

with $T_0$ fixed at 110° C. and the following values, which were identified by empirical means:

$e_0$=250 km; $\Delta T$=12° C.

When the temperature was equal to 110° C., we used the following empirical formula:

$e(T)=e_{lim}$, where $e_{lim}$=200 km

This test gave as the range the values shown in the penultimate column of the table below, which gives the conditions for three types of travel:

the first line of the table is a simulation of the urban cycle using a tire testing machine;

the second line is a mixture of travel on the road and the motorway; and the third line is a different mixture of travel on the road and the motorway;

column 1 gives the average load (for a maximum load of 425 daN);

column 2 gives the division of the journey, in the form of the number of stops of more than 15 minutes;

column 3 gives the average speed of travel;

column 4 gives the percentage of wet road;

column 5 gives the average temperature of the air outside;

column 6 gives the average temperature of the air inside during travel;

column 7 gives the actual measured range;

column 8 gives the range evaluated by the method forming the subject of the invention;

column 9 gives the "gain" for the driver by comparison with the minimum range quoted by the manufacturer (200 km).

| Load daN | Number of stops | Average speed km/h | % wet road | T outside air | T inside air | Measured range km | Estimated range km | Gain km |
|---|---|---|---|---|---|---|---|---|
| 310 | 187 | 48 | 0% | 20° C. | 54° C. | 1499 | 1206 | 1006 |
| 383 | 2 | 100 | 23% | 8° C. | 98° C. | 780 | 393 | 193 |
| 337 | 8 | 84 | 26% | 9° C. | 93° C. | 1751 | 439 | 239 |

In the case of the tests considered, the range of the run-flat system was linked to that of the insert bearing arranged around the rim of the wheel of the system.

It can be seen that the gain in the range given by the method forming the subject of the invention is large, even when there is the disadvantage of travel on a road/motorway at speed for a prolonged period and at relatively high load (second line of the table).

Finally, it is advantageous to provide an alarm for the driver when the remaining range falls lower than a predetermined value.

A second series of tests will now be described. This test series was carried out on a Peugeot 806 vehicle equipped with the PAX run-flat system, including a rubber safety bearing. The size of the tires was 205-650R440. The pressure of the tires was zero (valve removed).

As above, the maximum range was fixed at 1500 km and the only parameter used was the temperature (T) of the air inside the tire. For technical reasons, the maximum inside temperature which could be measured was 110° C.

When the temperature was below 110° C., we used the following empirical formula:

$e(t)=e_0'(T_0-T)+e_1'$ with $T_0$ fixed at 110° C. and the following values, which were identified by empirical means:

$e'_0 = 10.0$ km/° C., $e'_1 = 138$ km

When the temperature was equal to or greater than 110° C., we used the following empirical formula:

$$e(T) = e_{lim}, \text{ where } e_{lim} = 138 \text{ km}$$

This test gave as the range the values shown in the penultimate column of the table below, which gives the conditions for nine travel tests:

- the first column gives the average static load;
- column 2 gives the average speed of travel;
- column 3 is the average temperature of the air outside;
- column 4 gives the average temperature measured for the air inside the tire;
- column 5 gives the maximum temperature measured for the air inside the tire;
- column 6 gives the actual measured range;
- column 7 gives the range measured by the method forming the subject of the invention;
- column 8 gives the difference between the evaluated range and the actual range.

| Average load | Average speed of travel | $T_{ext}$ average during travel | T average during travel | mac{T} during travel | Actual range | Evaluated range | Difference |
|---|---|---|---|---|---|---|---|
| 542 daN | 64 km/h | 11° C. | 102° C. | 110° C. | 295 km | 175 km | −120 km |
| 542 daN | 69 km/h | 11° C. | 95° C. | 104° C. | 346 km | 264 km | −82 km |
| 542 daN | 60 km/h | 11° C. | 91° C. | 100° C. | 430 km | 328 km | −102 km |
| 542 daN | 100 km/h | 30° C. | 110° C. | 110° C. | 168 km | 138 km | −30 km |
| 542 daN | 65 km/h | 10° C. | 99° C. | 110° C. | 459 km | 213 km | −246 km |
| 542 daN | 44 km/h | 10° C. | 81° C. | 110° C. | 906 km | 342 km | −564 km |
| 460 daN | 39 km/h | 10° C. | 74° C. | 90° C. | 613 km | 445 km | −168 km |
| 542 daN | 40 km/h | 10° C. | 72° C. | 94° C. | 493 km | 486 km | −7 km |
| 542 daN | 61 km/h | 10° C. | 94° C. | 110° C. | 597 km | 262 km | −335 km |

The adjustment function selected is particularly easy to implement. As the results above show, it allows the actual conditions of use of the run-flat system to be substantially improved by allowing a longer period of use while travelling on a flat tire when the actual conditions of use permit this.

In the case of the two tests considered, the range of the run-flat system was linked to that of the insert bearing arranged around the rim of the wheel of the system.

What is claimed is:

1. A method for assessing the range of a run-flat system which is fitted to a vehicle, the system comprising, at least for each wheel, a tire, a deflation alarm and means for supporting the tread of the tire in the event that the tire is deflated, wherein upon detecting an inflation pressure in a tire below a predetermined threshold, the method comprising the steps of:
   - measuring periodically a distance travelled and a parameter C(t) characteristic of the travel conditions;
   - determining as a function of C(t) and the distance travelled over the period $\Delta t$, a quantity characteristic of a potential elementary damage to the system over the said elapsed period $\Delta t$;
   - calculating an estimate of the overall damage from a combination of the potential elementary damage determined since the start of run flat travelling; and
   - transmitting to the driver of the vehicle a quantity linked to this estimate of overall damage to the run flat.

2. A method according to claim 1, further comprising determining a function F(C) from a series of rolling tests in conditions corresponding to those of the characteristic parameter C giving an estimate e for any value of the parameter C of the range of the new run flat system in travel conditions C:

$$e = F(C).$$

3. A method according to claim 2, wherein a potential elementary damage $\Delta J$ over the period of travel $\Delta t$ is estimated from a ratio:

$$\Delta J = \Delta d / e(t)$$

wherein $\Delta d$ is equal to the distance travelled by the vehicle over the period $\Delta t$.

4. A method according to claim 3, wherein a quantity J indicates the potential for using the run flat system at any period of measurement $\Delta t$, and wherein the estimate of J(t) is updated as:

$$J(t) = J(t - \Delta t) - \Delta J.$$

5. A method according to claim 4, wherein J is set to 1 when the run flat system is new.

6. A method according to claim 4, wherein the updated value of J(t) is transmitted to the driver of the vehicle.

7. A method according to claim 4, further comprising determining a quantity E as the remaining range of the run flat system under current conditions of travel, and wherein a current value of E is transmitted to the driver of the vehicle.

8. A method according to claim 7, wherein E is estimated as:

$$E = J(t) \times e(t).$$

9. A method according to claim 4, wherein when a given threshold $J_0$ is passed, the method further comprises transmitting a warning to the driver of the vehicle.

10. A method according to claim 1, wherein, when the measured pressure of inflation is below a given threshold, the tire concerned is considered to be in the run flat condition.

11. A method according to claim 1, further comprising the steps of measuring periodically the temperature of the inside air T, and using the temperature of the inside air as a parameter characteristic of the conditions of travel of the run flat system.

12. A method according to claim 11, further comprising calculating a value e(t) = F[T(t)] as:

$$e(t) = e_0 \exp\left[(\ln 2)\left(\frac{T_0 - T(t)}{\Delta T}\right)\right]$$

where:
- e is the said modelled range expressed in kilometres, which corresponds to the available range before breakdown of a travelling run flat system travelling at a constant temperature T;
- T is the temperature of the inside air (in degrees Celsius);
- $T_0$ is an arbitrary reference temperature (in degrees Celsius);
- $e_0$ is the estimated range at temperature $T_0$;
- ΔT (in degrees Celsius) is a difference in temperature corresponding to a reduction in the range by a factor of 2.

13. A method according to claim 11, further comprising calculating a value e(t)=F[T(t)] as:

$$e(t) = e'_0(T_0 - T) + e'_1$$

where:
- e is the modelled range expressed in km, which corresponds to the available range before breakdown of a run flat system travelling at a constant temperature T;
- T is the temperature of the inside air (in degrees Celsius);
- $T_o$ is an arbitrary reference temperature (in degrees Celsius);
- $e'_0$ is the gradient of the linear relationship between the range and ($T_0$-T), the difference between the maximum temperature and the measured temperature of the inside air;
- $e'_1$ is the estimated range at temperature $T_0$.

14. A method according to claim 13, in which a maximum value of e is limited to an arbitrary given value.

15. A method according to claim 1, further comprising using an inflation pressure of the tire concerned as a complementary characteristic parameter of the conditions of travel of the run flat system.

16. A method according to claim 1, further comprising using a location on the vehicle of the tire concerned as a complementary characteristic parameter of the conditions of travel of the run flat system.

17. A method according to claim 1, wherein the vehicle includes means for estimating the load applied to the wheels, the method further comprising using the load applied to the wheel concerned as a complementary characteristic parameter of the conditions of travel of the run flat system.

18. A method according to claim 1, wherein the vehicle includes means for measuring the temperature outside the vehicle, the method further comprising using the outside temperature as a complementary characteristic parameter of the conditions of travel of the run flat system.

19. A method according to claim 1, further comprising using a speed of travel of the vehicle as a complementary characteristic parameter of the conditions of travel of the run flat system.

20. A method according to claim 1, wherein the vehicle includes means for measuring the transverse forces applied to the wheels, the method further comprising using transverse forces applied to the wheels as a complementary characteristic parameter of the conditions of travel of the run flat system.

21. A method according to claim 1, further comprising using at least one of the speed of motion of the windshield wipers, the type of vehicle, and the longitudinal forces as a complementary characteristic parameter of the conditions of travel of the run flat system.

22. A method according to claim 1, further comprising using at least one of the air temperature inside the other tires on the vehicle and the pressure of the other tires on the vehicle as a complementary characteristic parameter of the conditions of travel of the run flat system.

23. A method according to claim 1, wherein the means of structural reinforcement of the tire comprises a bearing disposed radially outside relative to the rim of the wheel to support the tread of the said tire in the event of loss of pressure of inflation.

24. A method according to claim 1, wherein the means of structural reinforcement of the tire comprises reinforcement inserted into the structure of the said tire.

25. The method according to claim 1, further comprising the step of evaluating a re-use potential of the tire implicated by travel in the flat condition.

26. The method according to claim 1, further comprising the step of evaluating a re-use potential of the safety insert of the tire implicated by travel in the flat condition.

* * * * *